United States Patent [19]

Raynolds

[11] Patent Number: 5,017,300
[45] Date of Patent: May 21, 1991

[54] COMPOSITIONS AND PROCESS FOR USE IN REFRIGERATION
[75] Inventor: Stuart Raynolds, Wilmington, Del.
[73] Assignee: E. I. Du Pont de Nemours and Company, Wilmington, Del.
[21] Appl. No.: 388,922
[22] Filed: Aug. 3, 1989
[51] Int. Cl.$^5$ .............................. C09K 5/04
[52] U.S. Cl. ........................ 252/67; 252/68
[58] Field of Search .................. 252/58, 68, 67
[56] References Cited

U.S. PATENT DOCUMENTS

| | | | |
|---|---|---|---|
| 3,772,182 | 11/1973 | Hubbard | 252/68 |
| 4,455,247 | 6/1984 | Nakayama et al. | 252/68 |
| 4,526,945 | 7/1985 | Carlson et al. | 502/162 |
| 4,623,475 | 11/1986 | Enjo et al. | 252/68 |
| 4,694,054 | 9/1987 | Janowicz | 526/123 |
| 4,755,316 | 7/1988 | Magid | 252/68 |

FOREIGN PATENT DOCUMENTS

| | | | |
|---|---|---|---|
| 56-6090881 | 7/1981 | Japan | 252/67 |
| 96198 | 6/1984 | Japan | 252/68 |
| 61-1130389 | 6/1986 | Japan | 252/67 |

*Primary Examiner*—Prince E. Willis
*Assistant Examiner*—E. McAvoy

[57] ABSTRACT

A blend of tetrafluoroethane refrigerant with at least one polymer of the following: (a) an acrylic polymer having the formula

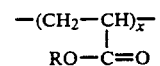

where
R is at least one alkyl group selected from $CH_3$, $C_2H_5$, $C_3H_7$ and $C_4H_9$; and
x is an integer from 3 to 20;
and (b) random copolymers from at least one alkyl acrylate monomer wherein the alkyl group may be anywhere from $CH_3-$ to $C_{18}H_{37}-$ provided that the average chain length of the alkyl groups in a major portion of said copolymer contains from 1 to 4 carbon atoms, and, optionally, with at least one other polar or nonpolar vinyl monomer said polymer (homopolymer or copolymer) having an SUS viscosity at 100° F. of at least 50 and a pour point of less than −20° C. is disclosed for use in compression refrigeration.

11 Claims, No Drawings

COMPOSITIONS AND PROCESS FOR USE IN REFRIGERATION

FIELD OF THE INVENTION

This invention relates to lubricants used with refrigerants in compression refrigeration and air-conditioning systems. More particularly, it relates to lubricants for use with saturated hydrocarbons having 1-4 carbon atoms that are partially or fully substituted with at least one atom of chlorine or fluorine, and have a normal boiling point of −80° C. to +50° C. Specifically, this invention relates to lubricants for use with tetrafluoroethanes, e.g. 1,1,1,2-Tetrafluoroethane (HFC-134a), and 1,1,2,2-Tetrafluoroethane (HFC-134), and of lesser importance, pentafluoroethane (HFC-125). These compounds are being considered as replacements for dichlorodifluoromethane (CFC-12), particularly in automotive air conditioning systems. The lubricants of this invention are not only miscible over the full operating temperature range for automotive air-conditioning with HFC-134a and HFC-134 but are also miscible with blends thereof and blended with other refrigerants.

BACKGROUND OF THE INVENTION

Refrigeration systems that use CFC-12 as the refrigerant generally use mineral oils to lubricate the compressor. (See for example the discussion in Chapter 32 of the 1980 ASHRAE Systems Handbook.) CFC-12 is completely miscible with such oils throughout the entire range of refrigeration system temperatures, i.e. −45° C. to 65° C. In automotive air-conditioning, paraffinic and naphthenic oils of about 500 SUS viscosity at 100° F. are usually used with CFC-12. These oils have "pour points" below −20° C. and viscosities of about 55 SUS at 210° F. and are completely miscible with the CFC-12 refrigerant over the range of temperatures from −10° C. to 100° C. Consequently, oil which dissolves in the refrigerant travels through the refrigeration loop in the air conditioning system and returns with the refrigerant to the compressor. It does not separate during condensation, although it may accumulate when the refrigerant is evaporated. At the same time, this oil which lubricates the compressor will contain some refrigerant which, in turn, may affect its lubricating properties.

When substituting HFC-134a or HFC-134 for CFC-12 in these refrigeration systems, it would be desirable to be able to use the same oils as used with CFC-12. It would not require any substantial change in equipment nor any significant changes in conditions used for the system. If lubricant separates from refrigerant during operation of the system, serious problems may result, i.e. the compressor could be inadequately lubricated. This would be most serious in automotive air-conditioning systems because the compressors are not separately lubricated and a mixture of refrigerant and lubricant circulate throughout the entire system. Unfortunately, however, the mineral oils are substantially immiscible with the tetrafluoroethanes.

Two recent publications of ASHRAE discuss the problems associated with separation of lubricants and refrigerants. These are "Fundamentals of Lubrication in Refrigerating Systems and Heat Pumps"Kruse and Schroeder ASHRAE Transactions Vol. 90, Part 2B, pps. 763-782, 1984 and "Evaluation of Lubricants for Refrigeration and Air-Conditioning Compressors", Spauschus, ibid pps. 784-798.

In summary, refrigerants which are not completely miscible with an oil in the full range of mixture compositions and operating temperatures may become miscible or immiscible as the temperature is raised or lowered from room temperature. The areas of immiscibility may assume a variety of shapes, i.e. parabolic or non-parabolic. As a parabola, the curve of miscibility temperature vs. percent oil in the mixture, may have its open or concave portion facing the low or high temperatures. The closed or convex-portion of the parabolic curve identifies, respectively, the maximum or minimum temperature above or below which the refrigerant and the lubricating oil are completely miscible. These temperatures are referred to as the maximum or minimum "consolute temperatures." Beside parabolas, these curves can assume skewed parabolic shapes or curves of varying slope wherein immiscibility occurs above or below the curve.

One of the objects of this invention is to provide a combination of lubricating oil and refrigerant such as tetrafluoroethane, e.g. HFC-134a and HFC-134, where the area of miscibility encompasses the full range of temperature and composition encountered in compression refrigeration, i.e. complete miscibility occurs for all compositions in the range of −10° C. to at least 20° C., preferably from −45° C. to about 100° C., the critical temperature of HFC-134a. Another object is to provide a process for using such compositions in compression refrigeration.

PRIOR ART

U.S. Pat. No. 4,248,726, issued Feb. 5, 1981, and U.S. Pat. No. 4,267,064, issued May 12, 1981, both to Nippon Oil Company et al, relate to the use of a polyglycol oil such as polyoxypropylene glycol (or an alkyl ether thereof) having a viscosity index of at least 150 and a glycidyl ether type epoxy compound as a high viscosity refrigeration oil composition for halogen-containing refrigerants. These polyglycol/glycidyl ether compositions are disclosed for use with Freon®11, 12, 13, 22, 113, 114, 500 and 502; and as being "particularly effective" with Freon®12 or 22.

Research Disclosure 17486 entitled "Refrigeration Oil by E. I. du Pont de Nemours and Company discloses polyalkylene glycols such as Ucon®LB-165 and Ucon®LB-525 sold by Union Carbide Corporation, for use with HFC-134a. These glycols are polyoxypropylene glycols that are mono-functional and are prepared from propylene oxide initiated with n-butanol. The publication states that these combinations of oil and refrigerant are miscible in all proportions at temperatures at least as low as −50° C. and are thermally stable in the presence of steel, copper and aluminum at 175° C. for about six days.

U.S. Pat. No. 4,755,316, issued July 5, 1988, to Allied-Signal Inc. also relates to the use of polyalkylene glycols. However, these glycols are at least difunctional with respect to hydroxyl groups and contain at least 80% propylene oxide units relative to the total, the remaining 20% may derive from ethylene or butylene oxide or esters, olefins and the like which are polymerizable with propylene oxide. It should be noted that only 100% oxypropylene units in the difunctional PAGs are exemplified in this patent.

SUMMARY OF THE INVENTION

The present invention is based on the discovery that the use of a sufficient amount to lubricate, usually 10-20% by volume for automotive use, and in some situations as high as 50% by volume, of at least one acrylic polymer having the formula

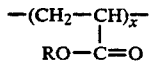

where POR is at least one alkyl group selected from CH3, C2H5, C3H7 and C4 H9 and
x is an integer from 3 to 20,
random copolymers of at least one alkyl acrylate monomer wherein the alkyl group "R" may be anywhere from CH3—to C18H37—provided that the average chain length of R in a major portion of said copolymer is from 1 to 4 carbon atoms, and copolymers of at least one such alkyl acrylate monomer with other polar or non-polar vinyl monomers, the polymer (homopolymer or copolymer) having an SUS viscosity at 100° F. of at least 50, preferably 100 to 1200, and a pour point of less than about $-20°$ C., will be completely miscible with the tetrafluoroethanes, usually 80-90% by volume of the tetrafluoroethanes, HFC-134 and HFC-134a, other saturated hydrocarbons having 1-4 carbon atoms that are partially or fully substituted with at least one atom of chlorine or fluorine and have a normal boiling point of $-80°$ C. to $+50°$ C., or blends thereof and with other refrigerants, in the range of temperatures from $-10°$ C. at least 20° C., preferably $-45°$ C to about 100° C.

In another sense, the lubricant of this invention is a polymer composed of at least 50% of acrylic monomeric units of the formula,

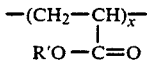

R' being an alkyl group having anywhere from 1 to 18 carbon atoms, i.e. from methyl to stearyl, the ratio of carbon-to-oxygen in said major amount of such units being from about 2 to about 4, about preferably from 2.5 to 3, the remaining units of said polymer being derived from other vinyl monomers including but not limited to other acrylic monomers including acrylic acid, methacrylic monomers including methacrylic acid, vinyl esters such as vinyl acetate, styrene, and preferably fluoroalkyl acrylates as described hereinafter. It should be noted that a carbon-to-oxygen ratio of 2.5 would apply if the major portion of the polymer were derived from

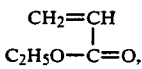

and a ratio of 3, if the major portion were derived from

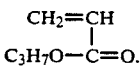

In general, the preferred acrylic polymers used as lubricants in this invention are the homopolymers poly(methyl acrylate), poly(ethyl acrylate), poly(propyl acrylate) and poly(butyl acrylate), wherein the molecular weight of the polymer is such that x in formula (1) is about 3 to 12, preferably about 6 to 10. It would be expected that the isomers of both poly(propyl acrylate) and poly(butyl acrylate) would also be useful in this invention.

It should be understood that most acrylic polymers consist of a distribution of chain lengths surrounding a median. Thus, the most preferred "x" of about 10 represents a median of chain lengths that may vary anywhere from 3 to about 20. It should also be understood that wide distributions are desirable for lubricants.

The weight ratio of refrigerant to the lubricant, the acrylic polymer, may be anywhere from 99/1 to 1/99, preferably 99/1 to 70/30. The viscosity of these oils may range from 50 to 3000 SUS at 100° F., but for most commercial uses, from 100 to 1200 SUS at 100° F.

It is known that the use of an appropriate amount of an "extreme pressure (EP) additive" improves the lubricity and load-bearing characteristics of oils and, thus, would improve the quality of the refrigerant-lubricant compositions. EP additives for use in the invention are included among those disclosed in Table D of U.S. Pat. No. 4,755,316. A preferred one is an organic phosphate; SYN-O-AD ®8478, a 70%/30% blend of tri (2,4,6-tri-t-butyl phenyl) phosphate/triphenyl phosphate, manufactured by the Stauffer Chemical Company.

EP additives may also be used in conjunction with some of the antiwear additives, oxidation and thermal stability improvers, corrosion inhibitors, viscosity index improvers, detergents and anti-foaming agents disclosed in Table D of U.S. Pat. No. 4,755,316. These additives may also be partially or fully fluorinated.

It has also been found that some polymethacrylates may also be useful as lubricants in the refrigeration systems involving the tetrafluoroethanes. For example, it has been found that poly(methyl methacrylate) and poly(ethyl methacrylate) are miscible with HFC-134a over the temperature range of $-50°$ C. to $+90°$ C. However, the pour points and viscosities of these oils do not meet the target values as set by the refrigeration industries. It would be expected that reacting or blending with polyalkylene glycols, or altering molecular weights or the distribution of chain lengths, or some similar modification would provide acceptable pour points and viscosities without any substantial adverse effect on miscibility with HFC-134a.

DESCRIPTION OF PREFERRED EMBODIMENTS

As stated previously, the tetrafluoroethanes, e.g. HFC-134a, HFC-134, particularly HFC-134a, have physical characteristics which allow substitution for CFC-12 with only a minimum of equipment changes in compression refrigeration. They could be blended with each other, as well as with other refrigerants, including CFC-12(CC12F2), HCFC-22(CHC1F2), HFC-152a(CH3CHF2), HCFC-124(CHC1FCF3), HCFC-124a(CHF2CC1F2), HFC-125(CHF2CF3), HCFC-142b(CH3CC1F2), HCF-32(CH2F2), HFC-143a(CH3CF3), HFC-143(CHF2CH2F), and FC-218(CF3CF2CF3); and for purposes of the present invention such blends are not excluded. However, only those blends of tetrafluoroethane with other refrigerants which are miscible with the lubricants of this invention in the range of $-45°$ C. to about $+20°$ C. are included.

HFC-134a, the preferred tetrafluoroethane refrigerant, may be prepared by any of the methods disclosed in the prior art; e.g., U.S. Pat. No. 2,745,886; 2,887,427; 4,129,603; 4,158,675; 4,311,863; 4,792,643 and British 1,578,933 and 2,030,981.

The preferred lubricants are the following polymerization products: the methyl to butyl acrylate homopolymers, copolymers of alkyl acrylate monomers wherein the alkyl group contains anywhere from 1 (methyl) to 12 (lauryl) carbon atoms provided that the average chain length of the alkyl groups in the copolymer is from about 1 to about 4 carbon atoms, and copolymers of such alkyl acrylate monomers

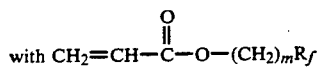

where m is an integer from 1 to 4, preferably 2, $R_f$ is $C_nF_{2n+1}$ and n is from about 1 to 20, preferably about 6 to about 10.

These acrylic polymers, homopolymers and copolymers, may be prepared by the processes disclosed in U.S. Pat. Nos. 4,526,945 and 4,694,054.

These lubricants may be varied to yield viscosities ranging from 50 to 3000 SUS at 100° F. Furthermore, the monomer(s) may be copolymerized with any of a variety of polar vinyl compounds including but not limited to vinyl ethers, other acrylates, methacrylates, acrylonitrile, vinyl ethoxylates or a halogenated monomer to modify the lubricating properties. Nonpolar monomers may also be used, e.g. ethylene, propylene, styrene etc. provided that they do not exceed 10% by weight of the copolymer. The lubricants may be blended with each other, as well as with other lubricants, e.g. perfluorocarbons, hydrofluorocarbons, naphthenic oils, paraffinic oils, alkylbenzenes, polyalkylene glycols, etc., to modify viscosity and/or lubrication properties.

Specifically, the lubricants used in the compositions of this invention, and in the invented method for providing lubrication in compression refrigeration and air-conditioning equipment have the following characteristics:

Viscosity at 100° F.

50 to 3000 SUS, preferably 100 to 1200 SUS, particularly about 500 SUS for automotive air-conditioning Viscosity Index Greater than 10, preferably at least 70 and higher Pour Point $<-10°$ C. preferably $-10°$ C. to about $-45°$ C. and $-20°$ C. for the 100 SUS and 500 SUS oils, respectively Solubility or miscibility range 100% from 100° C. to (a) less than $-40°$ C. to about 20° C. for 1-99 weight percent of HFC 134a in mixture with the lubricant of 100° F. viscosities of 50 SUS to 3000 SUS (b) less than $-10°$ C. for the preferred 500 SUS blend.

Four-ball wear test with a specific set of steel balls. Scar wear and coefficient of friction equal to or slightly higher than that for the oils currently used with CFC-12 in automotive air-conditioning, i.e., 0.37 mm scar wear and 0.07 friction coefficient when saturated with CFC-12 at atmospheric pressure.

"Falex"(load failure) test with a specific type of steel for the V-block and pin. The fail load equal to or greater than that for the CFC/refrigerant oil combinations, i.e., 1300 lbs. when saturated with CFC-12 at atmospheric pressure.

1. Solubility of Refrigerant in Lubricants

Six ml. blends of refrigerant and lubricant were used for the solubility studies. Generally, the mixtures contained 30, 60, and 90 wt. % refrigerant. These air-free mixtures were contained in sealed Pyrex ®tubes (7/16" I.D. ×5.5", ca. 12.5 cc capacity). The refrigerant/lubricant solubilities were determined by completely immersing the tube in a bath at each test temperature for a minimum of 15 minutes and providing agitation to facilitate mixing and equilibration. The accuracy of determining the temperatures when the refrigerant/lubricant blend became either miscible or immiscible was about ±2° C. The refrigerant/lubricant blends were called immiscible when the blend acquired and retained "schlieren" lines; formed floc; became cloudy; or formed two liquid layers. These solubility tests were run from about 93° C. to at least $-50°$ C. Tests were not run above 93° C. for safety and practical reasons.

2. Stability of Refrigerant and Lubricant

Three ml. of refrigerant and 0.3 ml. of lubricant plus coupons (steel 1010/copper/aluminum 1100 - $2\frac{7}{8}"\times\frac{1}{4}"\times1/16"$, 120-grit surface finish) were charged and sealed in a Pyrex ®tube (7/16"I.D. ×5.5", ca. 12.5 cc volume) under anaerobic conditions. The specimens were tied together at the top end with copper wire with copper-wire rings between the metals to separate the metals at the top end. The tubes were stored vertically at 268° F. for 11.8 days. Afterwards, the tube contents were examined for appearance changes. The changes were assigned "effect ratings," i e "0"—no change, "1"—slight but acceptable change, "2"—borderline change, "3"—slight but unacceptable change; and "4"—moderate unacceptable change.

3. Lubricity a. Four-ball Wear Test

The procedure is described fully in ASTM D4172. The method was modified as follows: A load of 20 Kg at 1200 RPM was put on the steel 52100 balls immersed in 10 ml. of lubricant for 60 minutes at 225° F. The refrigerant, HFC-134a or CFC-12, was bubbled through a Teflon ®capillary tube into the lubricant at the rate of 0.75 standard cu. ft./hr. to provide one atmosphere of pressure of refrigerant gas over the lubricant and a gas-saturated lubricant.

b. Falex Pin/V-Block Load-to-Failure Test

The procedure is described fully in ASTM D3233. The V-Block was made of AISI C-1137 steel (HRC-20 to 24 hardness, 5 to 10 microinches surface finish). The test pin was made of AISI 3135 steel (HRB-87 to 91 hardness, 5 to 10 microinches surface finish). These tests were run with refrigerant gas bubbling through the oil as in the "Four-ball Wear Test".

4. Viscosity and Viscosity Index a. Viscosity is a property that defines a fluid's resistance to shearing force. It is expressed in terms of absolute viscosity, kinematic viscosity or Saybolt Seconds Universal viscosity (SSU), depending on the method by which it is determined. Conversion from SSU to mm2/s (centistokes) can be readily made from tables contained in ASTM D-445, but it is necessary to know the density to convert kinematic viscosity to absolute viscosity. Refrigeration oils are sold in viscosity grades, and ASTM has proposed a system of standardized viscosity grades for industry-wide usage (D-2422).

b. Viscosity Index is a measure of the amount of change experienced by an oil with changes in temperature.

Viscosity decreases as the temperature increases; and increases as the temperature decreases. The relationship between temperature and kinematic viscosity is represented by:

$$\log \log (v + 0.7) = A + B \log T \quad \text{(Equation 1)}$$

where p0 v = kinematic viscosity, mm2/s (CST)
T = thermodynamic temperature (kelvin)
A,B = constants for each oil This relationship is the basis for the viscosity temperature charts published by ASTM and permits a straight line plot of viscosity over a wide temperature range. This plot is applicable over the temperature range in which the oils are homogeneous liquids.

The slope of the viscosity-temperature lines is different for different oils. The viscosity-temperature relationship of an oil is described by an empirical number called "the viscosity index" (VI) as referred to in ASTM D-2270. An oil with a high viscosity index (HVI) shows less change in viscosity over a given temperature range than an oil with a low viscosity index (LVI).

5. Pour Point

Any oil intended for low temperature service should be able to flow at the lowest temperature likely to be encountered. The procedure for determining pour point is described in ASTM D-97.

The invention will be more clearly understood by referring to the experiments and controls which follow:

Preparation of acrylate homopolymers

Although the following description is the procedure for making the ethyl acrylate homopolymer, similar procedures may be used to prepare the acrylic polymers listed for viscosity and pour point as shown in Table I and to prepare those listed for miscibility with the hydrofluorocarbon refrigerants, HFC-134a and HFC-134, as shown in Tables IIA and IIB. It should also be understood that viscosities for these acrylic polymers may be obtained anywhere from about 50 SUS to about 3,000 SUS at 100° F. by varying the process conditions in accordance with recommendations of those skilled in the art.

A 5 liter round bottom flask is fitted with a heating mantle, a nitrogen inlet/thermometer, a reflux condenser and two addition funnels (one liter and 1.5 liter capacities). The funnels are fitted to the flask using a "Y" connector.

Cumene (isopropyl benzene), 960 grams, is added to the flask; heated to boiling (about 153° C.) while being agitated and gently refluxed for thirty minutes. A slow purge of nitrogen is maintained throughout the procedure. Ethyl acrylate, 1,080 grams, is added to the larger addition funnel. A mixture of 53.3 grams of "Vazo" 67 [2,2'-Azobis (2-methylbutane nitrile)], 121 grams of 2-mercapto ethanol and enough cumene to make a solution, Solution A, having a total volume of 624 ml, is added to the smaller addition funnel.

Ethyl acrylate and Solution A are slowly added simultaneously to the refluxing cumene at such a rate that all of the ethyl acrylate and Solution A have been added in about 30 minutes. "Vazo" 67, 10.0 grams, is dissolved in 90 grams of cumene and added to the small addition funnel and then slowly added to the flask to complete the polymerization of ethyl acrylate.

The reaction mixture is allowed to cool to 110° C. and cumene is stripped under vacuum. The residue from this stripping is the final ethyl acrylate oil, i.e. poly(ethyl acrylate).

The viscosities and pour points of the ethyl acrylate oil and the other acrylic polymers were measured as described previously and the results are presented in Table I.

The solubility of refrigerants in the acrylic polymers was determined in accordance with the procedure described on pages 10 and 11. The results are presented in Tables IIA and IIB.

It should be noted that poly(ethyl acrylate) has been tested and used successfully with HFC-134a in compression refrigeration.

TABLE I

Viscosities, Viscosity Indices and Pour Points of Acrylate Oils

| Expmnt. No. | Lubricant | Viscosity (SUS) 100° F. | Viscosity (SUS) 210° F. | Viscosity Index | Pour Point (°C.) |
|---|---|---|---|---|---|
| 1 | poly(ethyl acrylate) | 492 | 61 | 85 | −20 |
| 2 | poly(methyl acrylate) | 790 | 61.7 | 16 | −7 |
| 3 | poly (n-butyl acrylate) | 241 | 51.4 | 124 | −34 |
| 4 | poly (n-propyl acrylate) | 265 | 51.1 | 105 | −29 |
| 5 | poly (n-hexyl acrylate) | 287 | | | |
| Ctrl A' | naphthenic oil[a] | 533 | 57.1 | 52 | −23 |
| Ctrl B' | paraffinic oil[b] | 534 | 64.5 | 96 | −12 |

[a]Suniso ® 5GS, a product of Witco Chemical Co.
[b]BVM-100N, a product of BVM Associates, Inc.

TABLE II A

Solubility of HFC-134a with Acrylate Oils
Test Range: 93 to 50° C.

| Expt.* No. | Oil | Miscibility Range (°C./°C.) for Shown Compositions (Weight %) HFC in HFC/oil | | |
|---|---|---|---|---|
| | | 30% | 60% | 90% |
| 6 | poly(ethyl acrylate) | 93/−12 | 93/−50 | 93/−50 |
| 7 | poly(methyl acrylate) | 93/−5 | 78/−5 | 88/−50 |
| 8 | poly (n-propyl acrylate) | 93/−12 | 93/−50 | 93/−50 |
| 9 | poly (n-butyl acrylate) | 90/10 | 85/15 | 82/−40 |

*poly (n-hexyl acrylate), poly (2-ethylhexyl acrylate) and poly (lauryl acrylate) were tested for solubility in compositions with HFC-134a and were either "insoluble" or miscible over a limited range of about 80° C. to 10° C.

TABLE II B

Solubility of HFC-134 with Acrylate Oils
Test Range: 93 to −50° C.

| Expt. No. | Oil | Miscibility Range (°C./°C.) For Shown Composition (Weight %) HFC in HFC/oil | | |
|---|---|---|---|---|
| | | 30% | 60% | 90% |
| 10 | poly(methyl acrylate) | 93/−20 | 93/−50 | 93/−50 |
| 11 | poly (n-butyl acrylate) | 93/−20 | 93/−50 | 93/−50 |
| 12 | poly (n-hexyl acrylate) | 93/−25 | 93/−20 | 93/−10 |

In the following tables, results of testing the solubility of HFC-134a with commercial and developmental oils (Table III) and with commercial fluorinated oils (Table IV) are presented:

TABLE III

SOLUBILITY OF HFC-134a WITH AVAILABLE MISCELLANEOUS REFRIGERANT OILS

| Expt. No. | | Miscible Range (°C.) for Indicated Concentrations (Wt %) of HFC-134a in Lubricant | | |
|---|---|---|---|---|
| | | 30% | 60% | 90% |
| | Expt. Dipentaerythritol Esters of Fatty Acids (c) | | | |
| Control A | 240 SUS | −50 + | −4 + | 40 + |
| Control B | 290 SUS | −44 + | −17 + | 70 + |
| | Expt. PEG Esters of Fatty Acids (d) | | | |
| Control C | 144 SUS | −21 + | 54 (a) | 54 (a) |
| Control D | 620 SUS | −4 + | 4 + | 70 + |
| Control E | 830 SUS | −6 + | 70 + | 70 + |
| | Naphthenic Oils (e) | | | |
| Control F* | Suniso ® 5GS (500 SUS, 38% aromatic) | 54 (a) | 54 (a) | 54 (a) |
| Control G | Witco 500 (500 SUS) | 54 (a) | 54 (a) | 54 (a) |
| Control H | Expt. Oil (520 SUS, 47% aromatic) | 54 (a) | 54 (a) | 54 (a) |
| Control I | Expt. Oil (529 SUS, 75% aromatic) | 54 (a) | 54 (a) | 54 (a) |
| | Paraffin Oil (f) | | | |
| Control J* | BVM-100N (500 SUS) | 54 (a) | 54 (a) | 54 (a) |
| | Alkyl Benzene | | | |
| Control K | Zerol 300 (300 SUS) (g) | 54 (a) | 54 (a) | 54 (a) |
| Control L | DN600 (125 SUS) (h) | 54 (a) | 54 (a) | 54 (a) |
| Control M | Atmos HAB15F (78 SUS) (i) | 55 + | Ins (b) | Ins (b) |
| | Silicone Oils | | | |
| Controls N, O, P | L-45 Oils (163, 231 & 462 SUS) (j) | Ins (b) | Ins (b) | Ins (b) |

+ - Soluble at and above shown temperature.
(a) - Perhaps it is soluble somewhere above shown temperature.
(b) - Completely insoluble from 93 to −50° C.
(c) - Hercules
(d) - CPI Engineering
(e) - Witco Chemical Company
(f) - BVM Associates
(g) - Shrieve Chemical Company
(h) - Conoco
(i) - Nippon Oil KK
(j) - Union Carbide
*Controls F and J are currently used with CFC-12 in automotive air conditioning.

TABLE IV

SOLUBILITY OF HFC-134a WITH COMMERCIAL FLUORINATED OILS
(Test Range 93° to −50° C.)

| Expt. No. | Lubricant | Miscible Range (°C.) for Indicated Concentrations (Wt. %) of HFC-134a in Lubricant | | |
|---|---|---|---|---|
| | | 30% | 60% | 90% |
| Ctrl Q | 500 SUS blend, Halocarbon 700/95−6.7/93.3 wt. % (a) | 93 to 8 | 93 to 7 | 93 to −4 |
| Ctrl R | 150 SUS, Krytox ® GPL Blend (b,c) | 93 to 0 | 93 to 10 | 93 to 20 |
| Ctrl S | 480 SUS, Krytox ® GPL Blend (b,c) | 93 to 10 | 93 to 20 | 93 to 20 |
| Ctrl T | 417 SUS, Fomblin ® Y 25/5 (b,d) | 93 to 5 | 93 to 15 | 93 to 15 |
| Ctrl U | 417 SUS, Fomblin ® Z-15 (b,d) | 93 to 5 | 93 to 28 | 75 to 28 |
| Ctrl V | 300 SUS, Demnum ® | 93 to 15 | 93 to 22 | 93 to 22 |

TABLE IV-continued

SOLUBILITY OF HFC-134a WITH COMMERCIAL FLUORINATED OILS
(Test Range 93° to −50° C.)

| Expt. No. | Lubricant | Miscible Range (°C.) for Indicated Concentrations (Wt. %) of HFC-134a in Lubricant | | |
|---|---|---|---|---|
| | | 30% | 60% | 90% |
| | S-65 (b,d) | | | |

(a) - Polychlorotrifluoroethylene oil. A product of Halocarbon Products Corporation.
(b) - A perfluorinated poly(alkylene ether) oil
(c) - A product of E. I. du Pont de Nemours and Co.
(d) - A product of Montefluos, Division of Montedison Group
(e) - A product of Daikin, Industries Ltd.

In the following table, Table V, the poly (ethyl acrylate) oil/HFC-134a combination is shown to be more stable in contact with metals than the commercially used combinations of oils with CFC-12.

TABLE V

Stability of HFC-134a in Contact with Oil Plus
Coupled Steel-1010/Copper/Aluminum-1100
at 268° F. for 11.8 Days
(Approximately equal to 10 years of car life)

| Expt. No. | Refrigerant | Oil | Visual-Effect Rating | | | |
|---|---|---|---|---|---|---|
| | | | Liquid | Steel | Cu | Al |
| 13 | HFC-134a | poly(ethyl acrylate) | 1 (a) | 0 | 1 (b) | 0 |
| Ctrl W | CFC-12 | Naphthenic oil | 4 (c) | 3 (d) | 2 (e) | 2 (b) |
| Ctrl X | CFC-12 | Paraffinic oil | 0 | 3 (d) | 0 | 0 |

(a) - Slight haze
(b) - A faint red tarnish
(c) - Clear brown plus moderate black precipitate
(d) - brown deposit/gray film — 100% of surface plus moderate deposit of solids at liquid-gas interface (LGI)
(e) - dark tarnish −25% plus moderate deposit at LGI
(f) - very slightly etched plus moderate deposit at LGI Extreme pressure additives used with commercial lubricants, i.e. with naphthenic oil or paraffinic oil and CFC-12, are acceptably soluble in the poly(ethyl acrylate) oil/HFC-134a system. This is shown in Table VI.

TABLE VI

Solubility of HFC-134a with Poly
(Ethyl Acrylate) Oils containing
Extreme-Pressure (EP) Additives
Test Range: 93 to −50° C.

| Expt. No. | EP Additive in Oil | | Miscible Range (°C./°C.) for Shown Wt. % HFC in HFC/Oil | | |
|---|---|---|---|---|---|
| | EP Additive (a) | wt % | 30% | 60% | 90% |
| 6 | 0 | 0 | 93/−12 | 93/−50 | 93/−50 |
| 14 | 1 | 1.3 | 93/0* | 93/0* | 93/−50 |
| 15 | 2 | 0.1 | 93/−15 | 93/−15 | 93/−50 |
| 16 | 3 | 0.6 | 93/−15 | 93/−20 | 93/−50 |

(a) - Additive Key:
0 - None
1 - SYN-0-AD ® 8478 butylated triphenyl phosphate/triphenyl phosphate (70/30 wt %) from the Stauffer Chemical Co.
2 - Lubrizol ® 1097, zinc (dialkyl dithio)phosphate from the Lubrizol Corporation.
3 - MLX-788, a proprietary three component additive from Union Carbide
*Temperatures lower than 0° C. may be reached by reducing the additive concentration, i.e. to 0.6 wt %.

The "Four-ball Wear Test" results shown in Table VII indicate that the poly(ethyl acrylate) oil, alone or with an extreme pressure additive, approaches the lubricity of the controls.

TABLE VII

Lubricity of Oils Under One Atmosphere of Refrigerant Gas Pressure in a Four-Ball Wear Test

| Expt. No. | Refrigerant | Oil (a) | EP Additive in EA oil (b) Key | Wt. % in Oil | Scar Wear (mm) (c)* | Coefficient of Friction (d)* |
|---|---|---|---|---|---|---|
| 17 | HFC-134a | 1 | 0 | 0 | 0.54 | 0.05 |
| 18 | HFC-134a | 1 | 1 | 0.6 | 0.57 | 0.06 |
| 19 | HFC-134a | 1 | 2 | 0.1 | 0.57 | 0.11 |
| 20 | HFC-134a | 1 | 3 | 0.6 | 0.55 | 0.08 |
| Ctrl Y | CFC-12 | 2 | NA** | NA | 0.37 | 0.07 |
| Ctrl Z | CFC-12 | 3 | NA | NA | 0.37 | 0.07 |

(a) - Oil Key:
1 - ethyl acrylate homopolymer as prepared in Example 1
2 - Naphthenic oil
3 - Paraffinic oil
(b) - EP Additive Key:
0 - None
1 - SYN-O-AD ® 8478
2 - Lubrizol ® 1097
3 - MLX-788
(c) - ±0.03 standard deviation
(d) - ±0.01 standard deviation
*the smaller, the better
**not applicable The results of the "Falex Pin/V-Block Test" are shown in Table VIII. It is noted that the combination of ethyl acrylate oil and HFC-134a is superior to the current commercial controls; and that the use of the extreme pressure additive, SYN-O-AD ®8478 provides a further improvement.

TABLE VIII

Load-Carrying Ability of Oils Under Extreme Pressure and One Atmosphere of Refrigerant Gas Pressure in a Falex Pin/V-Block Test

| Expt. No. | Refrigerant | Oil (a) | EP Additive in EA Oil (b) Key | Wt % in oil | Fail Load (lbs)* | Torque at Fail (in lbs)* |
|---|---|---|---|---|---|---|
| 21 | HFC-134a | 1 | 0 | 0 | 1500 | 38 |
| 22 | " | 1 | 1 | 0.6 | 1550 | 39 |
| 23 | " | 1 | 2 | 0.1 | 1350 | 38 |
| 24 | " | 1 | 3 | 0.6 | 1500 | 34 |
| Ctrl C' | CFC-12 | 2 | NA** | NA | 1250 | 24 |
| Ctrl D' | " | 3 | NA | NA | 1300 | 26 |

(a) - Oil Key
1 - polyethylacrylate oil
2 - Naphthenic oil
3 - Paraffinic oil
(b) - EP Additive Key
0 - None
1 - SYN-O-AD ® 8478
2 - Lubrizol ® 1097
3 - MLX-788
*The larger, the better
**not applicable In Table IX, the viscosity and solubility data with HFC-134a are provided for copolymers prepared from (1) a partially fluorine-substituted acrylate of the formula $$CH_2=CH$$
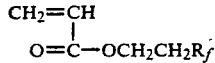
$$O=C-OCH_2CH_2R_f$$

where $R_f$ is $C_mF_{2m+1}$ and m was 6, 8, 10 and higher i.e. 60% C6F13—, 30% C8F17—, and about 10% C10F21—and higher; and (2) n-butyl acrylate, 2-ethylhexyl acrylate or lauryl acrylate.

Specifically, the copolymers were prepared by adding (1) the fluorine-containing acrylate with an appropriate amount of (2) the unsubstituted alkyl acrylate to a reaction vessel; and then repeating the procedure set forth in Example 1 on pages 13–14.

TABLE IX

Solubility of HFC-134a with Fluoroalkyl/Alkyl Acrylate Compositions
Test Range: 93° to −50° C.

| Expt No | Fluoroalkyl acrylate in comb. with % alkyl acrylate | 100° F. Viscosity (SUS) | Miscible Range (°C./°C.) for Shown wt. % HFC in oil | | |
|---|---|---|---|---|---|
| | | | 30% | 60% | 90% |
| * | 95% n-BA | 438 | 93/25 | 93/25 | 82/−40 |
| 25 | 90% n-BA | 401 | 93/−35 | 78/−40 | 90/−43 |
| 26 | 80% n-BA | 463 | 93/−50 | 93/−50 | 93/−50 |
| * | 70% n-BA | 591 | 93/10 | 93/10 | 93/−50 |
| * | 85% EHA | 540 | | Insoluble | |
| * | 85% LA | 576 | 93/20 | 93/20 | Insol. | n-BA normal-butyl acrylate
EHA 2-ethylhexyl acrylate
LA lauryl acrylate
*It should be noted the use of 10% and 20% of the fluoroalkyl acrylate does not adversely affect the solubility of HFC-134a with n-BA polymer oil and 15% fluoroalkyl acrylate does not change the poor solubility of HFC-134a with the polymer of EHA and LA.

The foregoing data indicate that the preferred alkylacrylates range from methyl to butylacrylate, in this embodiment of the invention. The composition range for butyl acrylate in the copolymers with fluoro acrylate is about 8 to 25 weight percent and the preferred range is 10 to 20 weight percent.

Since the homopolymers of ethyl and n-propyl acrylate are more soluble in HFC-134a than the n-butyl acrylate homopolymer, it would be expected that the copolymers of these acrylates with the fluoroalkyl acrylates would be even more soluble in HFC-134a.

Substantially the same procedure set forth on pages 13 and 14 for preparing acrylate homopolymers was used to prepare the acrylate copolymers used in Experiments 27–32. The amounts of materials used for preparing the five copolymers are set forth in Table X.

TABLE X

| Polymer | A | B | C |
|---|---|---|---|
| Monomer Wt. Ratio | 50/50 | 50/50 | 70/30 |
| Monomers | MA/PA | MA/BA | MA/HA |
| Solution (1) | | | |
| cumene | 40 | 40 | 40 |

TABLE X-continued

| Polymer | A | B | C |
|---|---|---|---|
| methyl acrylate | 22.5 | 22.5 | 31.5 |
| n-propyl acrylate | 22.5 | | |
| n-butyl acrylate | | 22.5 | |
| n-hexyl acrylate | | | 13.5 |
| 2-ethylhexyl acrylate | | | |
| Solution (2) | | | |
| "Vazo" 67 | 2.2 | 2.2 | 2.2 |
| 2 Mercaptoethanol | 5.2 | 5.2 | 5.2 |

Solutions (2) were diluted with cumene to a volume sufficient to feed solutions (1) and (2) simultaneously to completion. 0.44 grams "Vazo" 67 were diluted with cumene to a volume of 4.4 m. This solution was post fed to complete the reaction.

The viscosities and pour points of the copolymers were measured as described earlier and the results are presented in Table XI.

TABLE XI
Viscosities of Acrylic Copolymer Oils

| Expt. No. | Viscosity Oil | (SUS) 100° F. |
|---|---|---|
| 27 | Polymer A | 8075 |
| 28 | B | 607 |
| 29 | C | 807 |

The solubility of the refrigerant in the acrylic copolymers was determined in accordance with the procedure described earlier and the results are presented in Table XII.

TABLE XII
Solubility of HFC-134a with the Acrylic Copolymer Oils
Test Range: 93 to −50° C.

| | | Miscibility Range (°C./°C.) for Shown Compositions Wt. % HFC in HFC/oil | | |
|---|---|---|---|---|
| Expt. No. | Oil | 30% | 60% | 90% |
| 30 | Polymer A | 93/−10 | 93/−50 | 98/−50 |
| 31 | B | 93/−20 | 93/−50 | 84/−50 |
| 32 | C | 93/−20 | 91/−50 | 81/−50 |

What is claimed is:

1. A composition for use in compression refrigeration comprising:
   (a) a saturated hydrocarbon selected from the group consisting of 1,1,1,2-tetrafluoroethane, 1,1,2,2,-tetrafluoroethane and pentafluoroethane; and
   (b) sufficient amount to provide lubrication of at least one polymer selected from the following:
   (1) an acrylic polymer having the formula

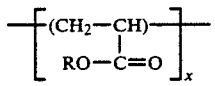

where R is at least one alkyl group selected from CH3, C2H5, C3H7 and C4H9, and x is an integer from 3 to 20; and
   (2) a copolymer of at least one alkyl acrylate monomer having the formula

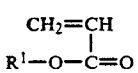

wherein R1 may be anywhere from CH3—to C18H37—, provided that the average chain length of the alkyl groups in a major portion of said polymer contains from 1 to 4 carbon atoms, with at least one other vinyl monomer;

said polymer or copolymer having a SUS viscosity at 100° F. of at least 50.

2. The composition of claim 1 wherein component (a) is 1,1,1,2-tetrafluoroethane.

3. The composition of claim 1 wherein component (b) is at least one homopolymer selected from the group consisting of poly(methyl acrylate), poly(ethyl acrylate), poly(propyl acrylate) or poly(butyl acrylate), wherein x in formula (b 1) is about 3 to 12.

4. The composition of claim 3 where component (b) is a poly(ethyl acrylate).

5. The composition of claim 3 where component (b) is poly(methyl acrylate).

6. The composition of claim 3 where component (b) is poly(propyl acrylate).

7. The composition of claim 3 where (b) is poly(butyl acrylate).

8. The composition of claim 1 wherein component (b) is a copolymer of methyl acrylate, ethyl acrylate, propyl acrylate or butyl acrylate with

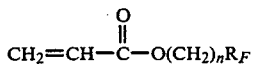

wherein $R_f$ is a perfluoroalkyl group from CF3—to C20F41—and n is an integer from 1 to 4.

9. The composition of claim 8 wherein $R_f$ comprises 60% C6F13—, 30% C8F17—and about 10% C10F21—and higher and wherein n=2.

10. The composition of claim 8 wherein said copolymer is a copolymer of 75–92% by weight of n-butyl acrylate, n-propyl acrylate methyl acrylate or ethyl acrylate.

11. In a method for compression refrigeration wherein, in combination with a lubricant, a saturated hydrocarbon selected from the group consisting of 1,1,1,2-tetrafluoroethane, 1,1,1,2-tetrafluoroethane and pentafluoroethane is used as the refrigerant; the improvement which comprises using as the lubricant about 10–50% by volume in the combination with said refrigerant of at least one polymer selected from the following
   (1) an acrylic polymer having the formula

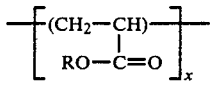

where R is at least one alkyl group selected from CH3, C2H5, C3H7and C4H9, and x is an integer from 3 to 20;
   (2) a random copolymer from at least one alkyl acrylate monomer having the formula

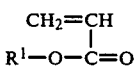

wherein R1 may be anywhere from CH3—to C18H37—, provided that the average chain length of the alkyl groups in a major portion of said polymer contains from 1 to 4 carbon atoms; and
   (3) a copolymer of at least one alkyl acrylate monomer having the formula

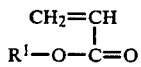
wherein R1 may be anywhere from CH3— to C18H37—, provided that the average chain length of the alkyl groups in a major portion of said copolymer contains from 1 to 4 carbon atoms, with at least one other vinyl monomer;
said polymer or copolymer having an SUB viscosity of 100° F. of at least 50 .
* * * * *